(12) United States Patent
Puttanna et al.

(10) Patent No.: US 9,887,857 B2
(45) Date of Patent: Feb. 6, 2018

(54) METHOD FOR SCHEDULING MANAGEMENT OPERATION ON DEVICES IN A HOME NETWORK

(71) Applicant: Samsung Electronics Co., Ltd., Gyeonggi-do (KR)

(72) Inventors: Chethan Konanakere Puttanna, Tumkur (IN); Bharat Kumar Prathipati, Bangalore (IN); Deepraj Prabhakar Patkar, Bangalore (IN)

(73) Assignee: Samsung Electronics Co., Ltd (KR)

( * ) Notice: Subject to any disclaimer, the term of this patent is extended or adjusted under 35 U.S.C. 154(b) by 358 days.

(21) Appl. No.: 14/665,487

(22) Filed: Mar. 23, 2015

(65) Prior Publication Data

US 2015/0333976 A1    Nov. 19, 2015

(30) Foreign Application Priority Data

May 14, 2014 (IN) .......................... 2392/CHE/2014

(51) Int. Cl.
| | |
|---|---|
| *H04L 12/24* | (2006.01) |
| *H04L 12/26* | (2006.01) |
| *H04L 12/64* | (2006.01) |
| *H04W 4/00* | (2009.01) |
| *H04W 12/08* | (2009.01) |

(52) U.S. Cl.
CPC ........ *H04L 12/6418* (2013.01); *H04L 41/082* (2013.01); *H04L 43/0835* (2013.01); *H04W 4/001* (2013.01); *H04W 12/08* (2013.01); *H04L 43/106* (2013.01)

(58) Field of Classification Search
CPC .. H04L 41/5041; H04L 43/08; H04L 47/2433

USPC ........ 709/208, 217, 218, 220, 228; 370/252, 370/338, 389
See application file for complete search history.

(56) References Cited

U.S. PATENT DOCUMENTS

| | | | |
|---|---|---|---|
| 6,701,363 B1* | 3/2004 | Chiu ................... | H04L 12/2602 380/255 |
| 7,694,005 B2* | 4/2010 | Reckamp ............ | H04L 12/2803 709/230 |
| 2007/0011681 A1* | 1/2007 | Shu ....................... | G06F 9/4881 718/102 |
| 2007/0283013 A1* | 12/2007 | Park ....................... | H04L 63/02 709/225 |

(Continued)

OTHER PUBLICATIONS

"Remote Control of Mobile Devices in Android Platform"—Villan et al, Oberta de Catalunya University, Oct. 2013 https://arxiv.org/pdf/1310.5850.pdf.*

*Primary Examiner* — Randy Scott
(74) *Attorney, Agent, or Firm* — The Farrell Law Firm, P.C.

(57) ABSTRACT

A method for scheduling a management operation on devices in a home network is provided. The method includes identifying at least one device among a plurality of devices in a home network to schedule the management operation by a management server; obtaining log information from the at least one device identified by the management server; determining nature of the management operation on the at least one device identified by the management server; and scheduling the management operation on the at least one device identified by the management server in response to the determined nature and the obtained log information.

12 Claims, 8 Drawing Sheets

(56) References Cited

U.S. PATENT DOCUMENTS

| | | | |
|---|---|---|---|
| 2010/0218191 A1* | 8/2010 | Kannan | G06F 9/5027 718/103 |
| 2015/0067014 A1* | 3/2015 | Akagawa | H04L 67/10 709/201 |
| 2015/0207661 A1* | 7/2015 | Kulkarni | G06F 9/5016 709/224 |

* cited by examiner

Device which supports Wi-Fi and other Radio frequencies

Wi-Fi enabled smart appliance

Low power RF enabled smart appliance

Device which provides the connection between home network and backbone network

METHOD FOR SCHEDULING MANAGEMENT OPERATION ON DEVICES IN A HOME NETWORK

PRIORITY

This application claims priority under 35 U.S.C. §119(a) to an Indian Patent Application filed in the Indian Intellectual Property Office on May 14, 2014, and assigned Serial No. 2392/CHE/2014, the entire content of which is incorporated herein by reference.

BACKGROUND OF THE INVENTION

1. Field of the Invention

The present invention generally relates to device management in a home network, and more particularly, to a method for scheduling a management operation on devices in a home network.

2. Description of the Related Art

The growing popularity of smart home technologies will lead to heavy utilization of network bandwidth, as these technologies allow deployment of many wireless devices at home. Since these devices at home develop with many user based services, these heavily deployed devices require a management facility for most of their management operations, such as, upgrades (software/firmware), diagnoses, configuration changes, and so on.

Generally, these management operations are controlled by one central server called Device Management (DM) server. This server has home devices info up-to-date and these servers are expected to maintain up-to-date information of all devices which are being managed. Whenever there is a management operation that needs to be performed on a few devices of the home, this server is expected to take care of all the activities from initiating the request to the end of the management operation. Obviously, these kinds of management operations add traffic to the ongoing home network operations, and this might lead to a case where home networks are highly affected. In some cases, they even go to the level of clogging the home network, for example, scenarios where management operations of most of the home devices need to be performed in bulk.

In a typical smart home scenario, the devices could be fully functional with a sufficient amount of resources (display, power, storage, processor, and so on). These devices are connected directly (e.g., Wi-Fi enabled) to the home access point, and they could be other sets of devices which are having low power (mostly operated on batteries) and with low processing power, limited storage, and so on. The constrained devices not having sufficient resources could only be connected to home access point through Multiple RF Radio for Different Standards (MRRD) kind of devices (for example, home gateway having support for Wi-Fi, ZigBee, Z-Wave, and etc.).

Smart home technology and solutions are currently emerging by deploying many devices at home to provide automated services. In order to provide these features, smart home technology is making most of the electronic devices around a home to act "smart" or fully automated with more devices deployed. Many devices may exist in the home network such as Intruder Alarm Systems, Different kind of Lighting systems, Window Covering Controller, Door Lock, Smart Plug, White Goods, Meter Interface, Scene Selector, Combined Interface, and so on.

Considering a home scenario, where few devices are used by home users for playing on-line video, another home user is using a hand held device to hear a song by streaming the music from the Internet, at the same time one or more IP-Camera devices are in process of uploading real-time captured videos to the remote server, and the other user is controlling some home appliance remotely, that is, all these activities are happening in parallel. In such scenarios, few access routers and the router which connects with a backbone network are already carrying heavy traffic and the local network will be overloaded if the management server wants to do some management activity at this juncture.

In another scenario, when the management server wants to perform a few management related activities on a group of home devices, and if all these home devices start responding at same time and start communicating with the management server all at once, there will be a huge amount of traffic within the smart home.

This might even result in a situation, where responses of the management server to the few device requests may not reach an actual requested device due to the heavy traffic at home, and as a result, some devices may have to retry and there is no guarantee that this re-transmission will be successful or not due to timeouts. Non-constrained devices performing transmissions might be allowed. However, these non-planned or improperly initiated management activities should never cause or yield a retrial for the constrained devices. Re-try by a constrained device means more power consumption, waste of processing power, and so on.

SUMMARY OF THE INVENTION

The present invention has been made to solve at least the above-mentioned problems and/or disadvantages and to provide at least the advantages described below. Accordingly, an aspect of the present invention is to provide a method for scheduling management operation on devices in a home network.

Another aspect of the present invention is to provide a method for sending management information to constrained devices in the home network.

Another aspect of the present invention is to provide a method for scheduling management operation on devices through a management server based on obtained network traffic information in the home network.

According to an aspect of the present invention, a method for scheduling a management operation on at least one device is provided. The method includes identifying at least one device among a plurality of devices in a home network to perform the management operation by a management server; obtaining a log information from at least one device identified by the management server; determining nature of the management operation on at least one device identified by the management server; and scheduling the management operation on the at least one device identified by the management server in response to the determined nature and the obtained log information.

According to another aspect of the present invention, a server for scheduling a management operation on at least one device is provided. The server is configured to identify the at least one device among a plurality of devices in a home network to perform the management operation by a management server, to obtain a log information from at least one device identified by the management server, to determine nature of the management operation on at least one device identified by the management server, and to schedule the management operation on at least one device identified by the management server in response to the determined nature and the obtained log information.

BRIEF DESCRIPTION OF THE DRAWINGS

The above and other aspects, features, and advantages of certain embodiments of the present invention will be more apparent from the following description with reference to the drawings, in which.

DETAILED DESCRIPTION OF EMBODIMENTS OF THE PRESENT INVENTION

Figure 1:
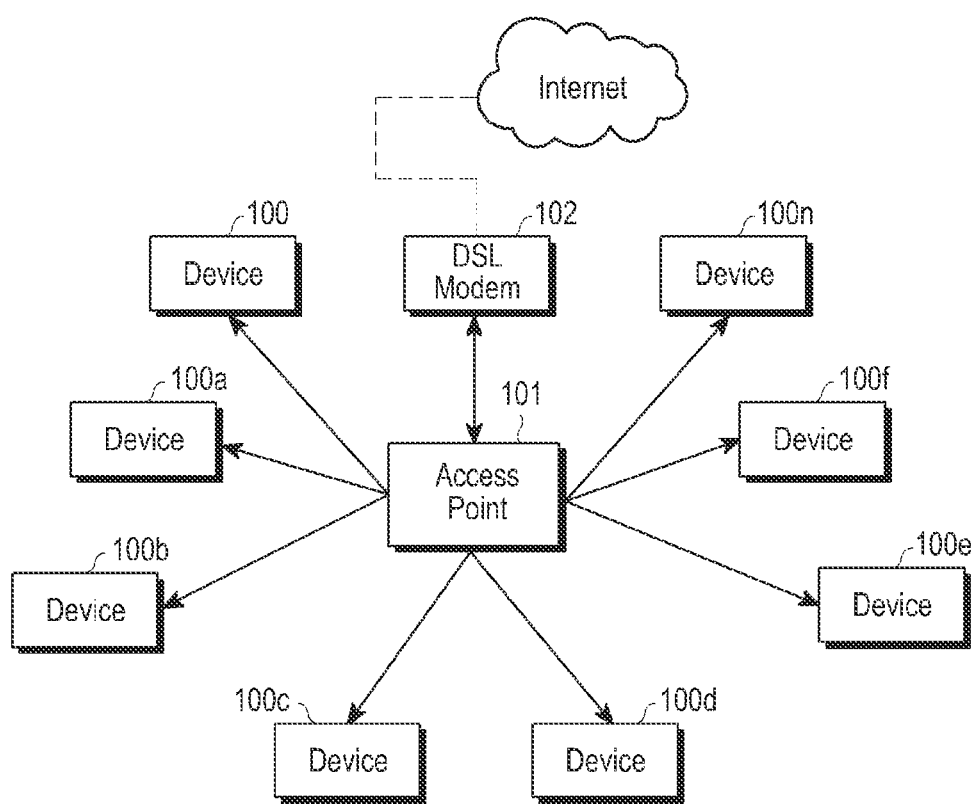
FIG. 1 illustrates various devices in a home network according to an embodiment of the present invention.

The present invention herein and the various features and advantageous details thereof are explained more fully with reference to the embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the present invention herein can be practiced and to further enable those skilled in the art to practice the present invention herein. Accordingly, the examples should not be construed as limiting the scope of the present invention herein.

The present invention provides a method for scheduling a management operation on devices in a home network. The method includes initiating the management operation by a management server on the devices in the home network. The management server identifies the devices in the home network for performing the management operation. The management server requests the identified devices in the home network for obtaining the network log information.

In an embodiment of the present invention, the management server stores the obtained network log information for future use and makes a list of applications that should be paused for performing the management operation based on the requirement of the management operation.

Further, the management server determines the nature of the management operation that is to be performed on the devices in the home network. If it is determined that the nature of the management operation is critical, then the management server obtains application log details (that are stored in the management server) and determines the application which is less prioritized for the device(s) in the home network. The management server sends a request to the device(s) in the home network to pause the application(s) for an estimated hold time and sends a management request to the device(s).

The device(s) which receives the request from the management server hold its application for requested time without using the network. Further, the device(s) upon receiving the management request from the management server, starts performing the management operation. The management server also calculates the end time of the management operation within which the device(s) completes the management operation.

When the nature of the management operation is normal, then the management server calculates the "ReqRplyStartTime" and "ReqRplyEndTime" time for each management request.

The 'ReqRplyStartTime' represents the time at which the selected device needs to initiate the management activity, whereas the 'ReqRplyEndTime' represents a time by which the management operation is estimated to be completed.

Further, the management server adds the "start" and "end" timestamp for each management operation in the management request which is sent to the devices during normal management operation.

Throughout the description, the terms "Device Management (DM) server" and "management server" are used interchangeably.

Referring to the drawings, similar reference characters denote corresponding features consistently throughout the figures.

FIG. 1 illustrates various devices in a home network according to an embodiment of the present invention. Referring to FIG. 1, the home network comprises a plurality of devices such as a device 100, a device 100a, a device 100b, a device 100c, and so on to a device 100n. The devices 100a-100n are connected to an Access Point (AP) 101 for obtaining the wireless internet connectivity. The AP 101 is connected to a Digital Subscriber Line (DSL) modem 102 which is connected to the Internet. The devices 100a-100n in the home network can be of any kind ranging from electric power operated devices to battery driven devices.

In general, the devices 100a-100n share a common communication channel for connecting to the home network. Further, there may be different applications running on different devices in the home network and each application (which is running on the device) consumes network resources of the home network. The network resources consumed by the applications running on the devices 100a-100n may vary based on the type of the applications running on the devices 100a-100n. The traffic in the home network may vary at different instants of time based on the usage of the devices that are connected in the home network.

Figure 2:
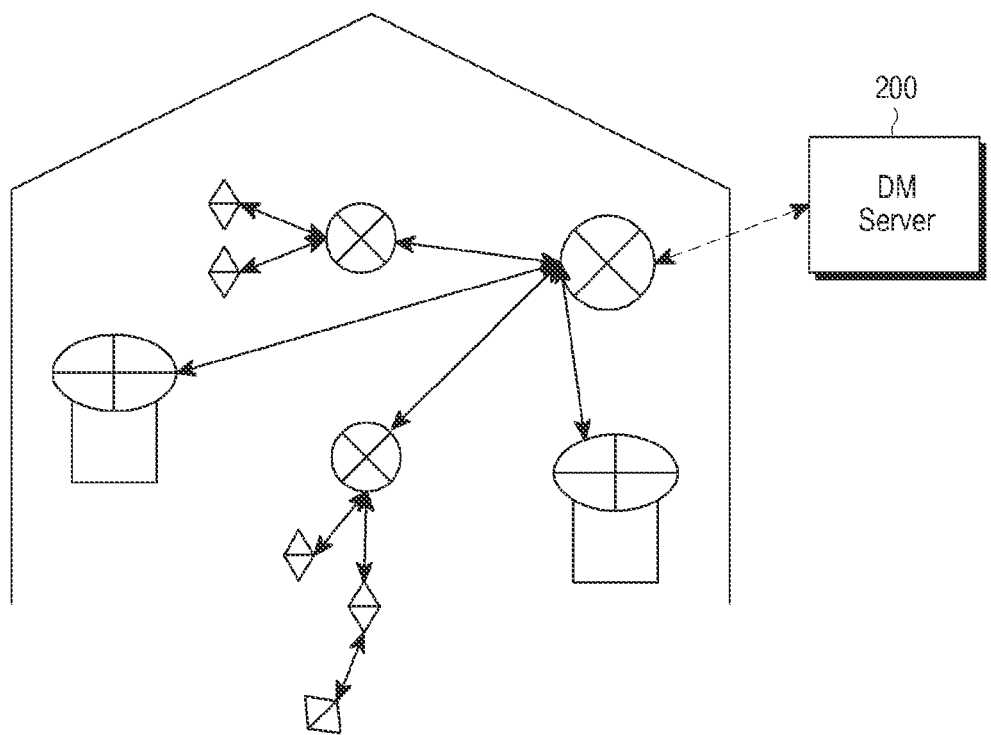
FIG. 2 illustrates a typical smart home scenario according to an embodiment of the present invention.
Figure 2:
Figure 2:
Figure 2:
Figure 2:

FIG. 2 illustrates a typical smart home scenario according to an embodiment of the present invention. Referring to FIG. 2, in a smart home scenario, there exists different devices such as the devices that are capable of supporting Wireless-Fidelity (Wi-Fi) and other radio frequencies, Bluetooth, Wi-Fi enabled smart appliances, smart refrigerators, smart washing machines, low power Radio Frequency (RF) enabled smart appliances, smart phones, and so on, but not limited thereto. The devices shown in the FIG. 2 are operated either using electric power or using battery power. These devices are connected to a single device (for example, a DSL modem) that provides the connection between the home network and a backbone network. Further, the devices in the home network are monitored by a Device Management (DM) server 200 as shown in FIG. 2.

Generally, the management operations on the devices in the home network are controlled by the DM server 200. The DM server possesses the up-to-date information of the devices in the home network, which are being managed. Whenever there is a management operation that needs to be performed on few devices of the home network, the DM server 200 performs all the activities that are associated with the management operation.

Figure 3:
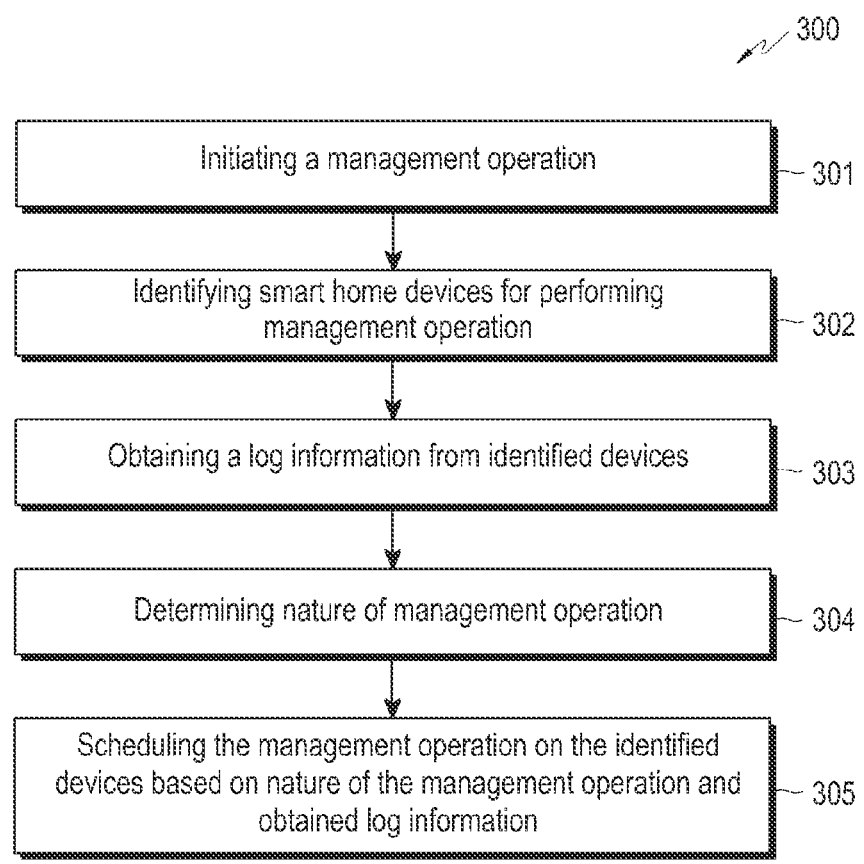
FIG. 3 is a flow diagram illustrating a method for scheduling management operation on devices in the home network according to an embodiment of the present invention.

FIG. 3 is a flow diagram illustrating a method for scheduling a management operation on devices in the home according to an embodiment of the present invention. In step 301, the management server 200 initiates the management operation. In an embodiment of the present invention, one or more devices which are registered to the DM server 200 initiate the management operation, or the DM server initiates the management operation in case of a new management operation.

In step 302, the management server 200 identifies the devices in the home network (i.e., smart home devices) for performing the management operation.

In step 303, the management server obtains the network log information from one or more identified devices in the home network. The management server identifies the devices for the management operation in step 302 and the management server sends a request to the identified devices to obtain the network log information. The devices (which receive the request from the management server) start collecting their current network log information. When the network log information is ready, the devices post the network log information to the management server.

There are different types of network log information, as described below, obtained by the management server.
The number of applications running on the selected device is denoted by 'n'.
The start time of the application is denoted by 'st'.
The estimated end time of the application is denoted by 'est'.
The type of the application running are illustrated as examples of "Video", "Audio", "Data" or "Simple" commands.
The throughput of the each application is denoted by 'th'.
The trip time of the packet sent by the device (which is identified for sending a trip time) is denoted by 'tt'.

Further, the management server selects few above-mentioned devices to send and receive a Packet Trip Time (PTT) packet along with the network log information. The PTT is a packet which is used to determine the trip time of the packet which is travelled across a main access router.

In an embodiment of the present invention, the management server requests more than one device to provide the PTT packets for obtaining an aggregated PTT. In an embodiment of the present invention, the management server requests PTT packets from more than one device and estimates (near real-time) ongoing PTT from collected PTTs.

In an embodiment of the present invention, the management server sends the PTT packet with a current time stamp to other devices (which are identified to receive the PTT packet). The devices which receive PTT packet captures received time of the PTT packet and these devices (which receive the PTT packet from the management server) start collecting the network log information. When the network log information is ready, the devices (which receive the PTT packet from the management server) post time stamps of PTT packets and network log information to the management server.

The network log information (which is obtained as a part of network log collection at the management server) includes the following parameters as described below.

$tt_k$=trip of the Packet received from $k^{th}$ device (which is one of the devices identified for collecting trip time).
$n_j$=number of applications running on $j^{th}$ device.
$st_{ij}$=start time of the $i^{th}$ application at $j^{th}$ device in Coordinated Universal Time (UTC).
$est_{ij}$=estimated stop time of the $i^{th}$ application at $j^{th}$ device in UTC. (It is assumed that each device will be provided with this time).
$th_{ij}$=throughput of $i^{th}$ application at $j^{th}$ device.
$tp_{ij}$=type of the $i^{th}$ application running on $j^{th}$ device.

Each application will be assigned with a weight based on its significance with the network usage by the DM server. The assumed weight for different types of application is follows:

video=1, audio=2, data=3, and system related operation=4.

When the management server obtains the network log information from the identified devices as described above, the management server performs the following calculations as set forth below.

Total throughput (bytes/sec) at $j^{th}$ device is calculated as Equation (1):

$$TH_j = \sum_{i=0}^{n} th_{ij} \quad (1)$$

wherein n is the number of application running on $j^{th}$ device.

In Equation (1), $j^{th}$ device is the device on which the management server wants to perform its operation or the device working as a proxy for its sub network).

The average throughput at all the devices is calculated as Equation (2):

$$A_{TH} = \frac{\sum_{j=0}^{d} TH_j}{d} \quad (2)$$

wherein d is the number of devices selected for logging the network information.

The average trip time of all k packets can be calculated as Equation (3):

$$A_{TT} = \sum_{k=0}^{d} \frac{tt_k}{k} \quad (3)$$

wherein k is the number of devices identified for reporting the Packet Trip Time (PTT).

The application load at $j^{th}$ device for time duration from current time ct to future time ct+t can be calculated as Equation (4):

$$DCL_{ij} = \sum_{t=ct}^{ct+t} \sum_{i=0}^{n} TP_{ij} * T_t \quad (4)$$

wherein n is the number of application running on $j^{th}$ device.

The application load at all selected devices for time duration from current time ct to future time ct+t can be calculated as Equations (5) and (6):

$$NCL_t = \sum_{t=ct}^{ct+t} \sum_{j=0}^{d} \sum_{i=0}^{n} TP_{ij} * T_t \quad (5)$$

wherein n is the number of application running on each device, d is the number of devices selected for logging the network information, t is the time duration which ends until a traffic load has to be estimated, and $$T_t = \begin{cases} 0 & STij > t+ct \\ & ESTij < t+ct \\ 1 & STij < t+ct \\ & ESTij > t+ct \end{cases} \quad (6)$$

wherein ct is the current time in UTC, t is the time till the home traffic is predicated.

If the management operation has to be performed on $j^{th}$ device or $j^{th}$ device is the access router for the device in its sub network which needs a management operation.

Here, $N_{th}$ is the nominal throughput at home, $N_{tt}$ is the nominal trip time, and these two are empirically obtained for the typical home network with allowed traffic. $\alpha$ and $\beta$ are the constants used as threshold values to find out the maximum load that can be handled by a network for the current management operation. N is the number device which needs a management operation, $ST_j$ is the time stamp to start the management operation for the $j^{th}$ device, and $ET_j$ is the estimated time stamp to end the management operation for the $j^{th}$ device.

```
FOR j = 1 to N
IF ((TH_j < α_j * N_th) && (A_TT < N_tt)) THEN
ST_j = CT
         ELSE IF ((TH_j > α_j * Nth) && (A_TT < N_tt)) THEN
             ST_j = min of {DCL_jt}
ELSE IF (A_TH < β_j * N_th) && (A_TT < N_tt)  THEN
         ST_j =min of {NCL_t}
ELSE
ENDFOR
```

The above method allocates a start time for each device which needs the management operation, the continued process of this method will be described below to determine the traffic behavior for the entire duration of the management operation for each device which needs to perform the management operation.

Here, $MO_d$ is the device d needs the management operation, and d could be 0 to N·$MT_d$ is the time duration required for a current management operation on each device with predetermined performance $\Psi$. Wherein $MT_d = Dtp_d * \Psi$ (seconds), and $Dtp_d$ is the type of the device d. $Dc_d$ is the valid time slot counter for the device d. $LA_d$ is a list of the application which has been registered as need to be restricted during the management operation of device d, and $LA_d$ is calculated based on the current management operation's priority and the application priority on the device. y is the iteration time, and y=max

```
{ MT_d } + max {ST_d}.
FOR n = 1 to y
FOR d = 1 to N
t = ST_d
             IF (NCL_(t+n) < (DCL_d(t+n) + MT_d)  AND   MT_d >0))
         THEN
                 Increment device valid count Dc_d
         ELSE
                 Update LA_d
             ENDIF
     ENDFOR
ENDFOR
```

Once the method gets the details of the traffic behavior and the application details which effects the current management operation, the continued method will be described below to validate current obtained operation times to complete the management operation.

Here, $Vc_d$ is the threshold selected to check the number of valid time slots to be found for device d to perform the current management operation.

```
FOR d = 1 to N
IF Dc_d  >= Vc_d THEN
         Device d's ReqRplyStartTime = ST_d
ReqRplyEndTime = ReqRplyStartTime + MT_d
ELSE
Remove the device d from the current management operation list.
ENDIF
ENDFOR
```

In step 304, the management server determines the nature of the management operation. The nature of the management operation is a critical management operation or a normal management operation, and is determined by the management server. For example, the critical management operation is an antivirus update on the devices in the home network, which may otherwise lead to security threats within the home network. A normal management operation includes a firmware upgrade, a software upgrade, configuration changes, and so on.

In step 305, the management server schedules the management operation on the one or more identified devices in a home network based on the determined nature of the management operation and the obtained log information. Priorities may be assigned to the applications based on the type of applications and the nature of the management operation by the management server.

In an embodiment of the present invention, when the management operation is critical, the management server determines that the application is less prioritized for the devices in the home network. Further, the management server sends the request to pause the application on the devices for a time interval in order to perform the critical management operation. When the nature of the management operation is determined to be critical, at least one of the applications running on the at least one device is identified based on the obtained log information, and is paused for initiating the critical management operation. The device may indicate a user to pause the identified at least one of the applications through a message for performing the management operation by the management server, and receive an input from the user to initiate the management operation by the management server.

In an embodiment of the present invention, when the management operation is normal (not critical), then the management server calculates the "ReqRplyStartTime" and "ReqRplyEndTime" for each management request. The "ReqRplyStartTime" represents the time at which the device needs to initiate the management activity, whereas the "ReqRplyEndTime" represents the time at which the management activity is estimated to be completed by the device.

Further, the management server adds the "start" and "end" timestamp for each management operation in the management request which is sent to the devices during the normal management operation.

Further, the various actions, units, steps, blocks, or acts described in the method described above can be performed in the order presented, in a different order, simultaneously, or a combination thereof. Alternatively, some of the actions, units, steps, blocks, or acts in the FIG. 3 may be omitted.

Figure 4:
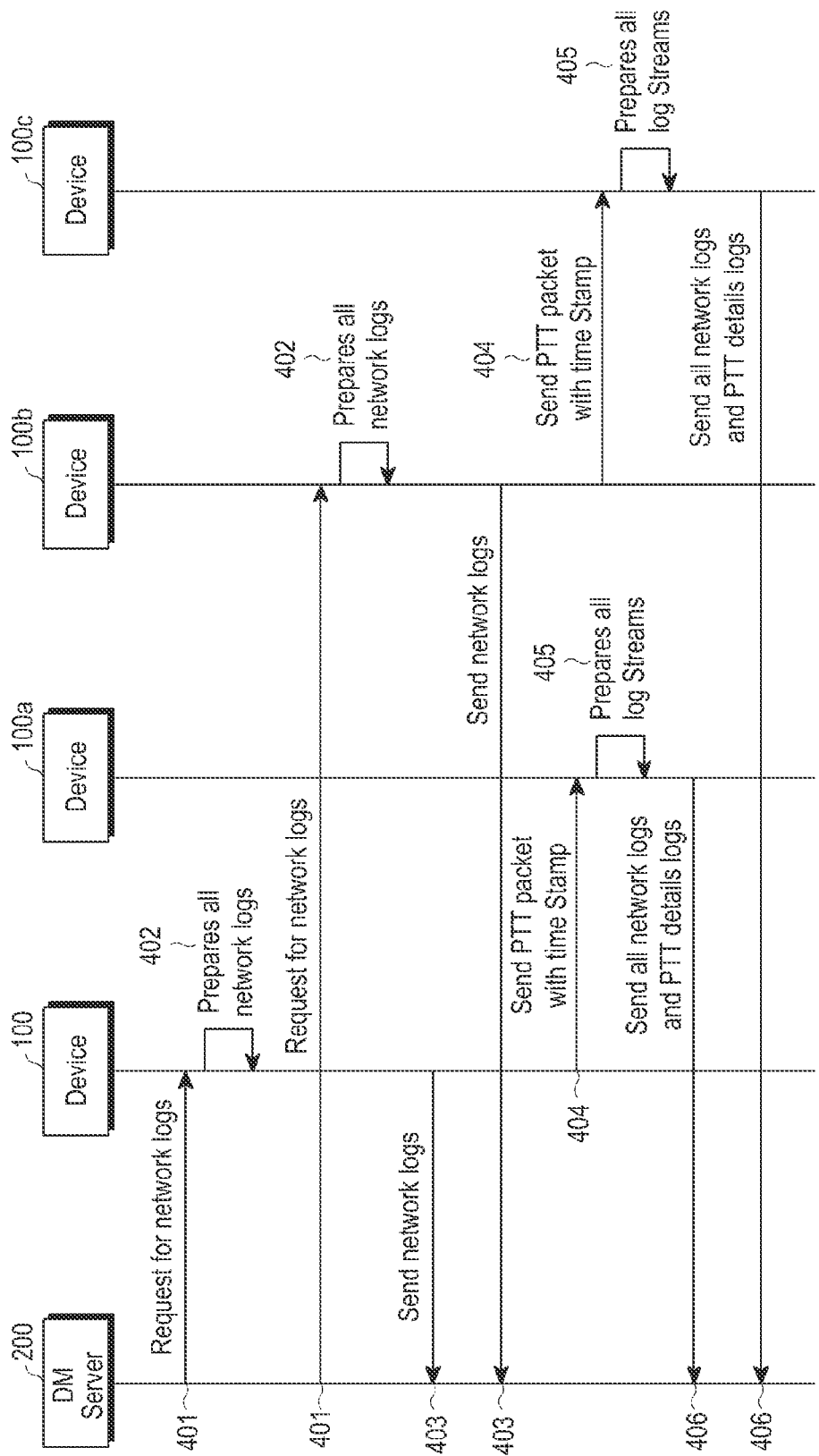
FIG. 4 illustrates a sequence diagram in which management server obtains the network log information from the devices in the home network according to an embodiment of the present invention.

FIG. 4 illustrates a sequence diagram in which management server obtains the network log information from the devices in the home network according to an embodiment of the present invention. In step 401, the DM server 200 sends a request for obtaining network logs to the selected devices 100 and 100b. In step 402, the devices 100 and 100b which receive the request from the DM server 200 prepare the current network log information. In step 403, when the log information is prepared, the devices 100 and 100b send log information to the DM server 200. In step 404, the device 100 and device 100b send a simple packet called Packet Trip Time (PTT) packet with current time stamp to the devices 100a and 100c (these devices are identified to receive the PTT packet), respectively. The devices 100a and 100c which receive PTT packet capture received time of the PTT packet and prepare all log streams in step 405. In step 406, when the log streams are prepared, the devices 100a and 100c send time stamps of PTT packets and network logs to the DM server 200.

The devices 100 and 100b also can forward the network logs to the devices 100a and 100c in order to avoid a separate individual network log update to the DM server, thus can save some message flow by sending bundled logs in a single request. The devices 100a and 100c can bundle the network logs received from the devices 100 and 100b, and send the network logs, which may be referred to as log stream (log stream is bundled network logs), to the DM server.

Figure 5:
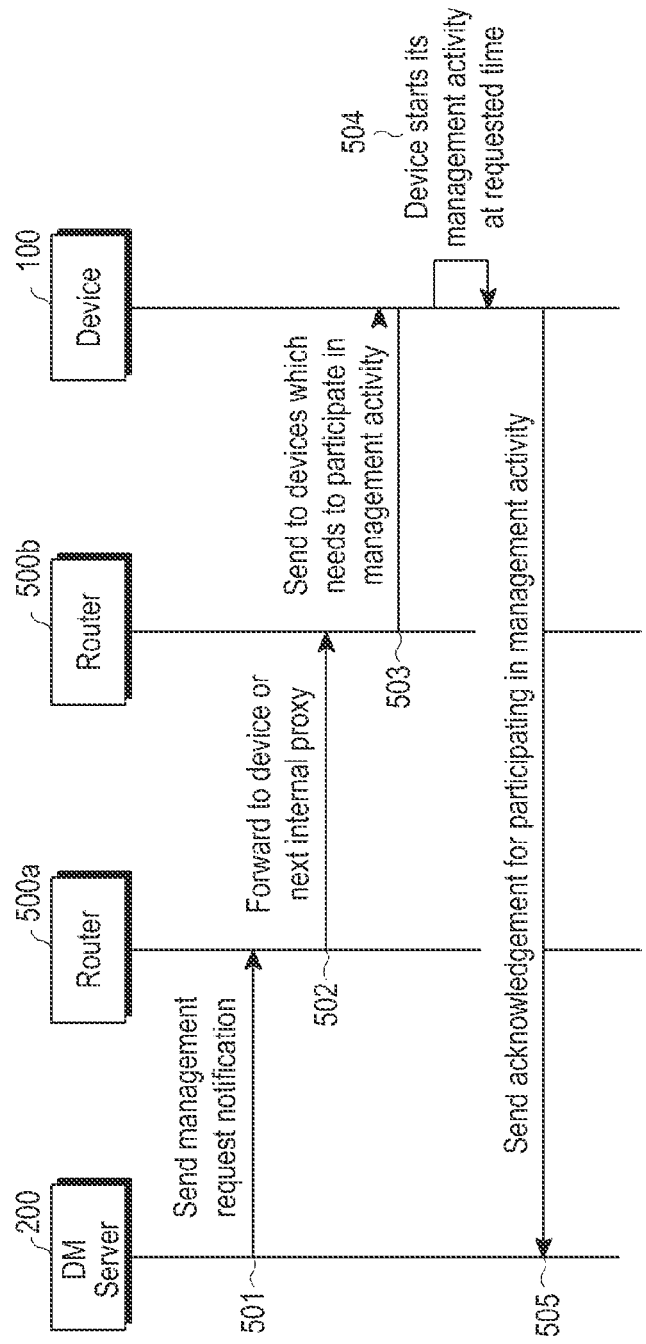
FIG. 5 illustrates a sequence diagram in which the management server sends management request to the devices for normal management operation, according to an embodiment of the present invention.

FIG. 5 illustrates a sequence diagram in which the management server sends a management request to the devices for a normal management operation according to an embodiment of the present invention. When the DM server 200 obtains the network log information from the devices (which are identified to perform the management operation), the DM server 200 determines the nature of the management operation. Referring to FIG. 5, in step 501, the DM server 200 sends the management request notification to the Router 500a for sending the management request to the device 100. The Router 500a receives the management request from the DM server 200 and forwards the management request to the next internal proxy, which is the Router 500b, in step 502. In step 503, the Router 500b sends the management request to the device 100 that are identified for performing the management operation. The device 100 receives the management request from the Router 500b and starts the management operation or the management activity at the requested time (also known as start time) in step 504. In step 505, the device 100 sends an acknowledgement to the DM server 200 for participating in the management operation.

Figure 6:
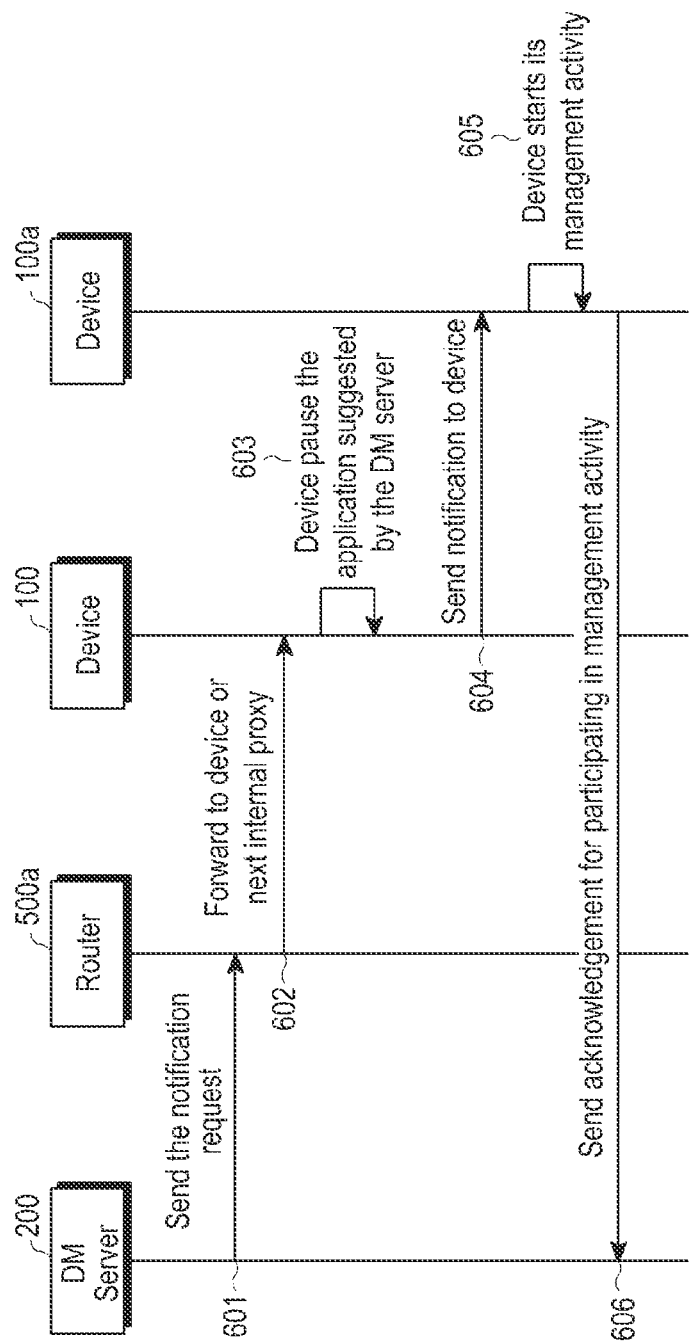
FIG. 6 illustrates a sequence diagram in which the management server sends management request to the devices for critical management operation, according to an embodiment of the present invention.

FIG. 6 illustrates a sequence diagram in which the management server sends a management request to the devices for a critical management operation according to an embodiment of the present invention. When the DM server 200 obtains the network log information from the devices (which are identified to perform the management operation), the DM server 200 determines the nature of the management operation. Referring to FIG. 6, in step 601, the DM server 200 sends the management request notification to the Router 500a for sending the management request to the device 100. The Router 500a receives the management request from the DM server 200 and forwards the management request to the device 100 in step 602. In step 603, the device 100a receives the management request and pauses the application suggested by the DM server. In step 604, the device 100 sends the notification request to the device 100a. When the device 100a receives the notification request, the device 100a starts the management activity in step 605. In step 606, the device 100a sends an acknowledgment to the DM server 200 for participating in management activity.

Figure 7:
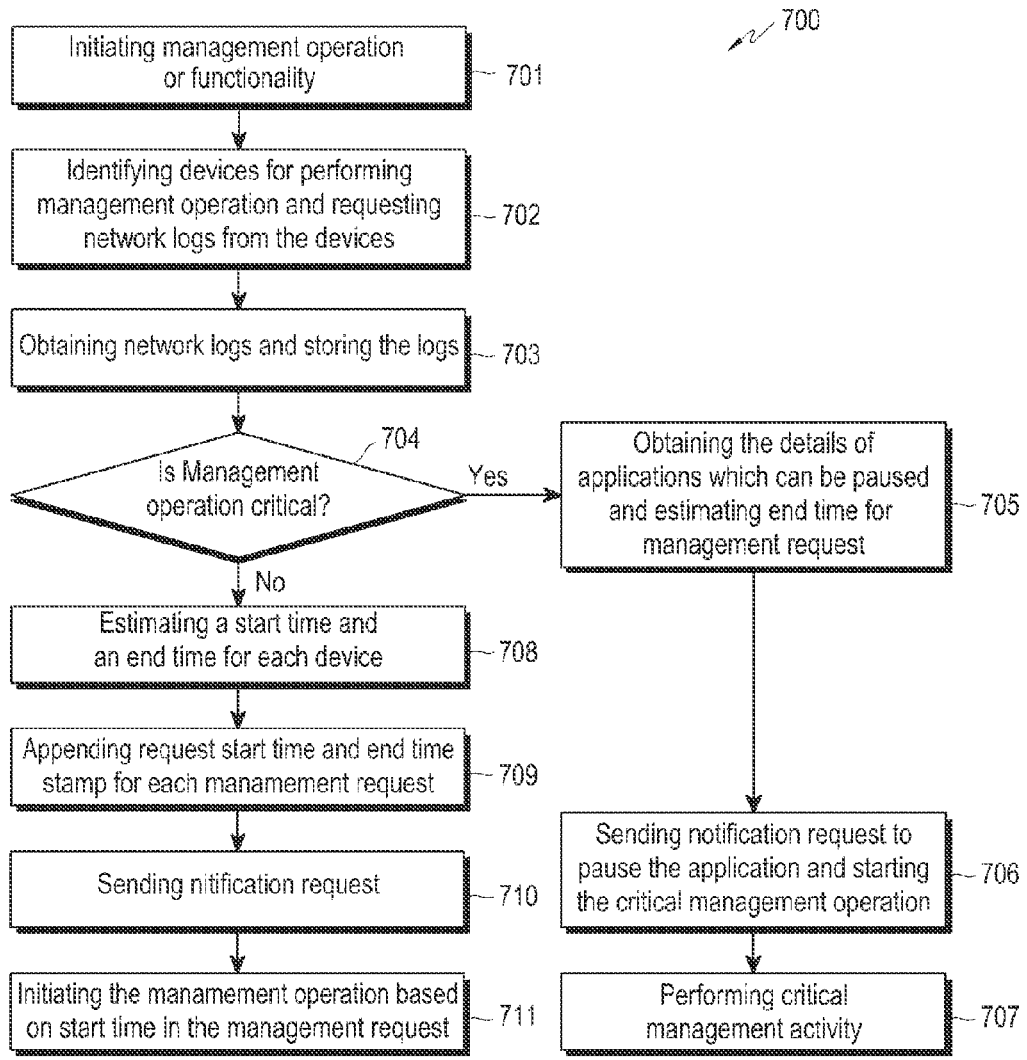
FIG. 7 illustrates a flow diagram explaining the method for scheduling management operation on various devices in the home through a DM server, according to an embodiment of the present invention.

FIG. 7 illustrates a flow diagram explaining the method for scheduling a management operation on various devices in the home network through a DM server according to an embodiment of the present invention. In an embodiment of the present invention, in step 701, the management server initiates the management operation or functionality on the devices in the home network.

In an embodiment of the present invention, the devices which are registered to the management server initiate the management operation to determine a new management operation or the management server initiates the management operation when there is a need for a new operation.

The management server checks for the requirement of the initiated management operation and starts a management functionality if any management operation needs to be performed.

In step 702, the management server identifies the devices in the home network for performing a management operation. Further, the management server requests network logs from the devices.

In step 703, the management server obtains the network logs from the devices in the home network. Further, the management server stores the network logs obtained from the devices.

In an embodiment of the present invention, the management server obtains all the network logs and stores the application log details for a future use to make a list of application which needs to be restricted during any critical management operation.

In step 704, the management server determines the nature of the management operation. If the management operation is determined to be critical in step 704, then, in step 705, the management server obtains the details of applications which can be paused for performing the management operation. Further, the management server estimates the end time for the management operation.

In an embodiment of the present invention, when the nature of the management operation is critical, then the management server obtains the application details that are stored (in the management server) and determines the application which is less prioritized for particular devices (the devices that are identified for performing the management operation).

In step 706, the management server sends a notification request to the device for pausing the application. Further, the method 700 allows the management server to start the management operation on the device.

In an embodiment of the present invention, the management server sends the notification request to pause the application for an estimated hold time. When the device receives the notification request from the management server, the application pauses the network usage for the requested time (hold time) and informs the management server.

In step 707, the device in the home network performs the critical management activity.

If the management operation is determined to be not critical in step 704, then, in step 708, the management server estimates the start time and the end time for each device (which is identified for performing the management operation) in the home network.

Since the management operation is not critical, the management server estimates the start time which is known as "ReqRplyStartTime" and the end time known as "ReqRplyEndTime" for each management request as described in FIG. 3.

In step 709, the management server appends the "start" and the "end" timestamp for each management request.

In step 710, the management server sends the notification request for performing the management operation on the identified device in the home network.

In step 711, the device in the home network initiates the management operation based on the start time and end time that are appended in the management request.

In an embodiment of the present invention, the device (which receives the notification request to hold its application based on the priority assigned to application) holds the application for a requested time without using the network.

In an embodiment of the present invention, the device which receives the critical management operation starts performing its management operation.

Further, the device which receives the normal management operation starts its operation from estimated "ReqRplyStartTime".

Since the devices in the home network are dynamic in nature in terms of usage ability and mobility, which creates lots of variation with respect to the predicated and real time traffic. In order to match the predicated traffic with real time traffic during the management operation, the management server requests the devices in the home network to send the notification, if any new device is connected in a home network or any drastic change in the device application behavior in the home network. This provides information to the management server to account the changed traffic with predicated one.

Further, the various actions, units, steps, blocks, or acts described in the method described above can be performed in the order presented, in a different order, simultaneously, or a combination thereof. Alternatively, some of the actions, units, steps, blocks, or acts in the FIG. 7 may be omitted.

Figure 8:
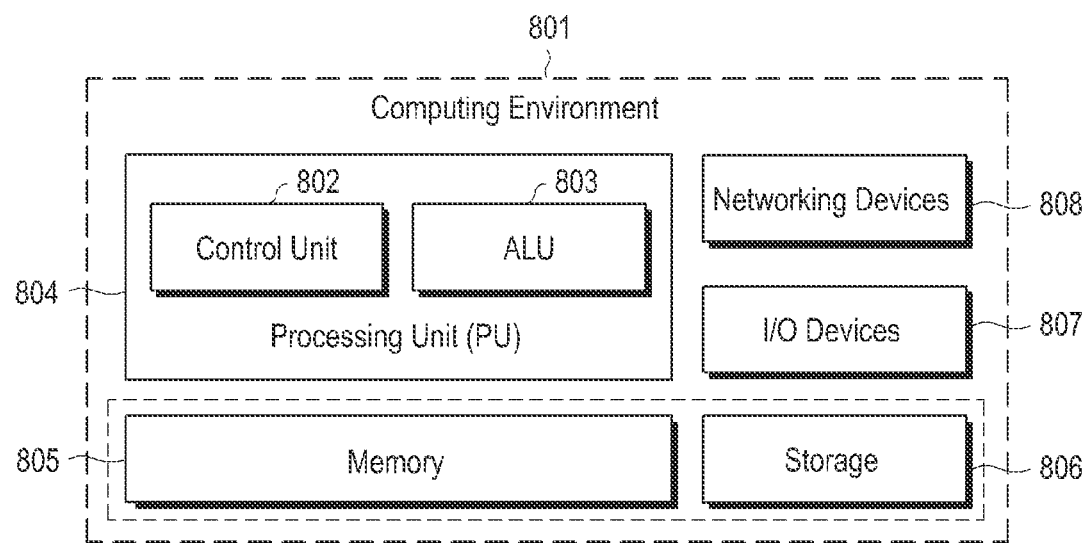
FIG. 8 illustrates a computing environment implementing the method for scheduling management operation on devices in the home network, according to an embodiment of the present invention.

FIG. 8 illustrates a computing environment implementing the method for scheduling a management operation on devices in the home network, according to an embodiment of the present invention. Referring to FIG. 8, the computing environment 801 comprises at least one processing unit 804 that is equipped with a control unit 802 and an Arithmetic Logic Unit (ALU) 803, a memory 805, a storage 806, a plurality of networking devices 808 and a plurality of Input/Output (I/O) devices 807. The processing unit 804 is responsible for processing the instructions of the algorithm. The processing unit 804 receives commands from the control unit 802 in order to perform its processing. Further, any logical and arithmetic operations involved in the execution of the instructions are computed with the help of the ALU 803.

The overall computing environment 801 is composed of multiple homogeneous and/or heterogeneous cores, multiple Central Processing Units (CPUs) of different kinds, special media, and other accelerators. The processing unit 804 is responsible for processing the instructions of the algorithm. Further, the plurality of processing units 804 may be located on a single chip or over multiple chips.

The algorithm comprising of instructions and codes required for the implementation are stored in either the memory unit 805 or the storage 806, or both. At the time of execution, the instructions may be fetched from the corresponding memory 805 and/or storage 806, and executed by the processing unit 804.

In case of any hardware implementations, various networking devices 808 or external I/O devices 807 may be connected to the computing environment to support the implementation through the networking devices 808 and the I/O devices 807.

The embodiments of the present invention disclosed herein can be implemented through at least one software program running on at least one hardware device and performing network management functions to control the elements. The elements shown in FIGS. 1, 2, 4, 5, 6, and 8 include blocks which can be at least one of a hardware device, or a combination of hardware device and software module.

The foregoing description of the specific embodiments will reveal the general nature of the embodiments of the present invention so that others can, by applying current knowledge, readily modify and/or adapt for various applications such specific embodiments without departing from the generic concept of the present invention, and therefore, such adaptations and modifications should and are intended to be comprehended within the meaning and range of equivalents of the present invention. It is to be understood that the phraseology or terminology employed herein is for the purpose of description and not limitation. Therefore, while the present invention herein have been described in terms of embodiments, those skilled in the art will recognize that the embodiments herein can be practiced with modification within the spirit and scope of the present invention defined by the appended claims and their equivalents.

What is claimed is:

1. A method for scheduling a management operation on at least one device, the method comprising:
    identifying the at least one device among a plurality of devices in a home network to schedule the management operation by a management server;
    obtaining log information from the at least one device identified by the management server;
    determining a mode of the management operation on the at least one device identified by the management server; and
    scheduling the management operation on the at least one device identified by the management server in response to the determined mode and the obtained log information,
    wherein obtaining log information comprises:
        transmitting, to a first device from among the at least one device, a request for obtaining first log information of the first device in order for the first device to transmit the request and the first log information to a second device;

receiving, from the second device, bundled log information including the first log information and second log information of the second device, wherein scheduling the management operation comprises:

estimating a start time and an end time for performing the management operation based on the obtained log information from the identified at least one device, when the mode of the management operation is determined to be normal, wherein the start time represents a time at which the management operation is estimated to be initiated by the at least one device and the start time is calculated based on a throughput of the at least one device, a packet trip time of the at least one device and an application load, and wherein the end time represents a time at which the management operation is estimated to be completed by the at least one device and the end time is calculated based on the start time, a type of the at least one device and a predetermined performance of the at least one device.

2. The method of claim 1, wherein the log information comprises a number of applications running on the at least one device, start times of the applications, estimated end times of the applications, throughput of the applications, type of the applications, and packet trip time (PTT).

3. The method of claim 1, wherein scheduling the management operation further comprises:

transmitting, to the at least one device, the start time and the end time.

4. The method of claim 1, wherein scheduling the management operation comprises:

when the mode of the management operation is determined to be critical, identifying at least one of the applications running on the at least one device based on the obtained log information, wherein the identified at least one of the applications is paused for initiating the critical management operation.

5. The method of claim 4, wherein further comprising:

indicating a user to pause the identified at least one of the applications through a message for performing the management operation by the management server; and receiving an input from the user to initiate the management operation by the management server.

6. The method of claim 1, wherein scheduling the management operation comprises assigning priorities to the applications based on the type of applications and the mode of the management operation by the management server.

7. An apparatus for scheduling a management operation on at least one device, the apparatus comprising:

a memory; and a processing unit coupled to the memory, wherein the processing unit is configured to:

identify the at least one device among a plurality of devices in a home network to schedule the management operation by a management server;

obtain log information from the at least one device identified by the management server;

determine a mode of the management operation on the at least one device identified by the management server; and schedule the management operation on the at least one device identified by the management server in response to the determined mode and the obtained log information, wherein the processing unit is further configured to estimate a start time and an end time for performing the management operation based on the obtained log information from the identified at least one device, when the mode of the management operation is determined to be normal, wherein the start time represents a time at which the management operation is estimated to be initiated by the at least one device and the start time is calculated based on a throughput of the at least one device, a packet trip time of the at least one device and an application load, and wherein the end time represents a time at which the management operation is estimated to be completed by the at least one device and the end time is calculated based on the start time, a type of the at least one device and a predetermined performance of the at least one device, wherein the processing unit is further configured to:

transmit, to a first device from among the at least one device, a request of obtaining first log information of the first device in order for the first device to transmit the request and the first log information to a second device;

receive, from the second device, bundled log information including the first log information and second log information of the second device.

8. The apparatus of claim 7, wherein the log information comprises a number of applications running on the at least one device, start times of the applications, estimated end times of the applications, throughput of the applications, type of the applications, and packet trip time (PTT).

9. The apparatus of claim 7, wherein the processing unit is configured to transmit the start time and the end time.

10. The apparatus of claim 7, wherein the processing unit is further configured to identify at least one of the applications running on the at least one device based on the obtained log information, wherein the identified at least one of the applications is paused for initiating the critical management operation, when the mode of the management operation is determined to be critical.

11. The apparatus of claim 10, wherein the processing unit is further configured to:

indicate a user to pause the at least one identified application through a message for performing the management operation; and receive an input from the user to initiate the management operation.

12. The apparatus of claim 7, wherein the processing unit is further configured to assign priorities to the applications based on the type of applications and the mode of the management operation.

* * * * *